Patented May 24, 1932

1,860,126

UNITED STATES PATENT OFFICE

EUGEN BERNHARD, OF FRANKFORT-ON-THE-MAIN, AND VALENTIN HILCKEN, OF GERSTHOFEN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

DISTILLATION OF CRUDE TURPENTINE

No Drawing. Application filed August 2, 1929, Serial No. 383,154, and in Germany August 14, 1928.

The present invention relates to improvements in the distillation of crude turpentine.

In order to separate crude turpentine into oil of turpentine and colophony, it is usual to subject the crude turpentine to distillation at atmospheric pressure, if desired, with the employment of steam, or in vacuo. In the case of distillations without the employment of steam, temperatures above 90° centigrade, and usually far above 90° centigrade up to 300° centigrade, are required, especially at the end of the distillations, in order to separate completely the oil from the resin; under these conditions polymerization phenomena occur, which lead on the one hand to a marked contamination of the oil, and on the other hand to an undesirable dark coloration of the resin. When distilling with the employment of steam, temperatures above 100° centigrade are not required, but the small drops of water which are enclosed in the resin remaining as the residue must be removed by a subsequent heating of the resin to temperatures far above 100° centigrade, so that in this case also the dark coloration already described occurs.

We have now found that these objections are avoided by treating crude turpentine at a temperature not exceeding 90° centigrade, and preferably at about from 50° to 60° centigrade, in vacuo with a fine mist of water or an organic liquid, which is not injurious to the materials under treatment and has a boiling point below the temperature chosen at the pressure applied, or of a mixture of both, for example with a steam containing a substantial quantity of small drops of water, the single particles of which are in an exceedingly fine state of distribution, by blowing these agents through a layer of the crude turpentine which is advantageously only shallow. Any pressure below atmospheric pressure may be employed, but generally the application of a pressure of from 15 to 50 millimetres mercury gives the best results. The process can be carried out in a tower or in a single common still or in several such vessels connected in parallel, and these vessels may contain filler bodies, such as Raschig rings, or baffle plates so that the material under treatment is divided into thin layers, for example when working in the counter-current principle in a tower. Such baffle plates may also assist in an even distribution of heat in the reaction vessel when the said plates are connected with those parts of the vessel which are heated. The degree of evacuation can be chosen according to any special requirements or regards of cost, but the lower is the degree of evacuation the better are the results obtained. The mist of water is advantageously blown through the thin layer in as many places as possible by means of nozzles or similar distributing apparatus. This intimate penetration of the material with the mist of water or the like, which under the working conditions is strongly superheated, causes a highly successful separation of the volatile oil of turpentine from the resinous fraction. If desired, the mist of water or of organic liquids, such as benzine, benzene or lower alcohols and the like may be mixed with a volatile carrier, such as steam or another gas or vapour, which does not attack the material under treatment and therefore will be called inert, such as carbon dioxide or nitrogen. The distillation proceeds very smoothly and is completed in a much shorter time than by the usual method. The oil of turpentine obtained is particularly pure, and has an agreeable and very slight smell. The resin obtained as a residue (colophony) has a much paler colour than the resin obtainable by the usual method of steam distillation, and unlike the latter there are no small drops of water enclosed in the gum; on the contrary, it is completely free from water without further treatment.

The following examples will further illustrate how the said invention may be carried out in practice, but the invention is not restricted to these examples. The parts are by weight.

Example 1

A mist of water is injected into and very finely distributed in a crude French turpentine contained in a vacuum distillation apparatus at a temperature of 50° centigrade and at a pressure of about 20 millimetres of mercury. Under these conditions the oily constituents are quickly separated from the resinous constituents, and a mixture of oil and water collects in the receiver. Towards the end of the distillation the temperature is raised to 80° centigrade in order to recover the last traces of the oil of turpentine from the residue, which latter is a pale yellow, clear resin, free from water. After separating the water from the mixture of oil and water, for each 100 parts of crude turpentine employed, 26 parts of a water-white oil of turpentine, having but a slight smell and having a boiling point between 154.5° and 160° centigrade at 760 millimetres, are obtained.

*Example 2*

A mist of ethyl alcohol, or steam or another inert gas or vapour which has been mixed with a mist of ethyl alcohol, or a mixture of the mist of ethyl alcohol with water mist, to which steam or another inert gas or vapour may be added, is injected into crude turpentine oil at a pressure of 20 millimetres mercury gauge and at a temperature of 45° centigrade. The distillate obtained can be separated if water be present therein by fractional distillation, or by adding water, if such be not present, and then distilling, whereby a clear, water-white turpentine oil with a slight smell is obtained.

What we claim is:—

1. The process of distilling crude turpentine which comprises treating the crude turpentine in vacuo while warming to a temperature below 90° C. with a finely divided mist of a liquid inert to the constituents of the turpentine and having a boiling point not higher than the temperature chosen at the pressure applied, the temperature of warming being sufficiently high to cause boiling of the added liquid at the pressure employed.

2. The process for distilling crude turpentine which comprises treating crude turpentine in vacuo while warming to a temperature below 90° C. with a mixture of a finely divided mist of a liquid inert to the constituents of the turpentine and having a boiling point not higher than the temperature chosen at the pressure employed, and an inert gaseous carrier, the temperature of warming being sufficiently high to cause boiling of the added liquid at the pressure employed.

3. The process of distilling crude turpentine which comprises treating the turpentine in vacuo while warming to a temperature below 90° C. with a finely divided mist of water, the temperature of warming being sufficiently high to cause water to boil at the pressure employed.

4. The process for distilling crude turpentine, which comprises treating crude turpentine at a temperature between about 50° and 60° centigrade with a finely divided mist of water at a pressure reduced to that point at which water boils at the temperature employed.

5. The process for distilling crude turpentine, which comprises treating crude turpentine at a temperature between about 50° and 60° centigrade with a mixture of a finely divided mist of water with an inert gaseous carrier at a pressure reduced to that point at which water boils at the temperature employed.

6. The process for distilling crude turpentine, which comprises treating crude turpentine at a temperature between about 50° and 60° centigrade with a mixture of a finely divided mist of water with carbon dioxide at a pressure reduced to that point at which water boils at the temperature employed.

7. The process of distilling crude turpentine which comprises treating the turpentine in vacuo while warming to a temperature below 90° C. with a mixture of a finely divided mist of water and ethyl alcohol, the temperature of warming being sufficiently high to cause boiling of the mixture of added liquids at the pressure employed.

8. The process for distilling crude turpentine which comprises treating the turpentine in vacuo while warming to a temperature below 90° C. with a mixture of a finely divided mist of water with ethyl alcohol and carbon dioxide, the temperature of warming being sufficiently high to cause boiling of the mixture of added liquids at the pressure employed.

9. The process as defined in claim 1 wherein the warming is carried out at temperatures ranging from 45 to 90° C.

10. The process as defined in claim 3 wherein the distillation is effected at a temperature of 50° C. and a pressure of 20 mms. of mercury.

11. The process as defined in claim 8 wherein the distillation is effected at a temperature of 45° C. and a pressure of 20mms. of mercury.

In testimony whereof we have hereunto set our hands.

EUGEN BERNHARD.
VALENTIN HILCKEN.